(12) United States Patent
Elwell et al.

(10) Patent No.: US 8,675,953 B1
(45) Date of Patent: Mar. 18, 2014

(54) CALCULATING AN OBJECT SIZE USING IMAGES

(75) Inventors: Joseph P. Elwell, San Diego, CA (US);
Alan F. Buhler, Escondido, CA (US);
Marianne Lu, Encinitas, CA (US)

(73) Assignee: Intuit Inc., Mountain View, CA (US)

( * ) Notice: Subject to any disclaimer, the term of this patent is extended or adjusted under 35 U.S.C. 154(b) by 349 days.

(21) Appl. No.: 13/019,436

(22) Filed: Feb. 2, 2011

(51) Int. Cl.
*G06K 9/00* (2006.01)

(52) U.S. Cl.
USPC ........... 382/154; 348/159; 348/169; 348/187; 382/103; 382/298

(58) Field of Classification Search
USPC ................ 348/159, 169, 187, 222.1, 333.05; 382/103, 154, 218
See application file for complete search history.

(56) References Cited

U.S. PATENT DOCUMENTS

| | | | |
|---|---|---|---|
| 6,798,515 B1 * | 9/2004 | Bachelder et al. | 356/397 |
| 7,349,584 B2 * | 3/2008 | Chen et al. | 382/294 |
| 7,593,036 B2 * | 9/2009 | Shiraki | 348/207.2 |
| 7,738,008 B1 * | 6/2010 | Ball | 348/159 |
| 8,289,434 B2 * | 10/2012 | Murase | 348/333.05 |
| 8,537,409 B2 * | 9/2013 | Marchesotti et al. | 358/1.18 |
| 2005/0276508 A1 * | 12/2005 | Coleman et al. | 382/275 |
| 2006/0017938 A1 * | 1/2006 | Ohtomo et al. | 356/611 |
| 2008/0002908 A1 * | 1/2008 | Chinen et al. | 382/274 |
| 2009/0244291 A1 * | 10/2009 | Saptharishi et al. | 348/187 |
| 2009/0279784 A1 * | 11/2009 | Arcas et al. | 382/190 |
| 2010/0292574 A1 * | 11/2010 | Hyun et al. | 600/443 |

* cited by examiner

*Primary Examiner* — Gregory M Desire
(74) *Attorney, Agent, or Firm* — Park, Vaughan, Fleming & Dowler LLP; Steven E. Stupp

(57) ABSTRACT

An electronic device that determines a geometric scale of an object using two or more images of the object is described. During operation, the electronic device calculates the size of the object along a direction using multiple images of the object that were taken from different perspectives (such as different locations and/or orientations in an environment) along with associated imaging-device characteristics. For example, the size of the object may be calculated using the images, the associated focal lengths of a digital camera that acquired the images, and the law of cosines. Using the scale of the object, an image of the object may be appropriately scaled so that it can be combined with another image.

20 Claims, 9 Drawing Sheets

CALCULATING AN OBJECT SIZE USING IMAGES

BACKGROUND

The present disclosure relates to techniques for calculating the geometric scale of an object. More specifically, the present disclosure relates to a technique for calculating the geometric scale or size of an object using two or more images of the object, which have different perspectives, and associated imaging-device characteristics (such as the focal lengths) when the images were acquired.

Thanks in part to an ever-expanding set of capabilities, electronic devices are becoming increasingly more versatile. This expanded functionality is increasing the popularity of a wide variety of applications, such as: virtual reality applications that provide artificial realities (which are sometimes referred to as 'virtual worlds'), which project users into computer-generated spaces (such as a three-dimensional space); and augmented reality applications that provide live or indirect views of a physical environment (which is sometimes referred to as 'augmented reality') whose elements are augmented by superimposed computer-generated information (such as supplemental information and image(s) associated with a virtual reality application).

However, it can be difficult to incorporate content from images of the real world (such as an object in a digital image) into a virtual world or an augmented reality. In particular, in the absence of a frame of reference, it can be difficult to determine the size of objects in the images, which can complicate the scaling of the content in the images. As a consequence, many applications request that users manually increase or decrease the size of objects extracted from images before they are included in a virtual or augmented reality (and, more generally, in another image). For example, a user may be asked to scale an image of a couch so that it can be overlaid or included in a virtual environment of a house. (Alternatively, the user may be required to take a picture using predefined conditions, such as a predefined angle or distance from an object, which can be very impractical.)

This problem can degrade the usefulness of virtual reality and augmented reality applications, and other image-processing applications. As a consequence, the overall user experience is often degraded, which can frustrate application users.

SUMMARY

The disclosed embodiments relate to an electronic device that calculates a geometric scale of an object. During operation, the electronic device accesses two or more images of the object. These two or more images may be associated with different perspectives of the object in an environment, and a given image may have an associated imaging-device characteristic. Moreover, the electronic device may calculate the geometric scale of the object based on the two or more images, the different perspectives and the imaging-device characteristics associated with the two or more images.

In some embodiments, accessing the two or more images involves receiving the two or more images from another electronic device. Alternatively, prior to accessing the two or more images, the electronic device may itself acquire the two or more images.

Note that a given perspective of the object may include: a location in the environment relative to the object and/or an orientation in the environment relative to the object. Moreover, the imaging-device characteristic may include: a distance between an imaging device that acquired the given image and the object and/or a focal length of the imaging device that acquired the given image.

Furthermore, the geometric scale may be calculated using the law of cosines.

In some embodiments, the two or more images include a sequence of images of the object along a circumference around the object in a plane. Moreover, the electronic device may calculate geometric scales of the object for multiple directions in the plane around the circumference of the object, and may determine a two-dimensional surface of the object in the plane based on the calculated geometric scales in the plane. Note that the geometric scales may be calculated based on a difference between locations associated with the two or more images and predefined reference markers in the environment. Additionally, the electronic device may calculate the geometric scales for different planes, thereby determining a three-dimensional surface of the object. In these embodiments, the geometric scales may be calculated based on a difference between locations associated with the two or more images and the predefined reference markers in the environment.

Furthermore, the electronic device may scale an image of the object based on the calculated geometric scale. Then, the electronic device may generate a combined image by combining the scaled image of the object with another image, and may provide the combined image. Note that the scaling may be based on another geometric scale associated with the other image.

In some embodiments, the geometric scale is calculated based on a predefined geometric scale associated with the object.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an electronic device, a technique for calculating a geometric scale of an object, and a computer-program product (e.g., software) for use with the electronic device are described. During operation, the electronic device determines the geometric scale of the object using two or more images of the object. In particular, the size of the object along a direction can be calculated using multiple images of the object that were taken from different perspectives (such as different locations and/or orientations in an environment) along with associated imaging-device characteristics. For example, the size of the object may be calculated using the images, the associated focal lengths of a digital camera that acquired the images, and the law of cosines. Using the scale of the object, an image of the object may be appropriately scaled so that it can be combined with another image.

By facilitating the calculation of the geometric scale of the object, this image-processing technique may allow images acquired using a cellular-telephone camera or a digital camera to be combined. Furthermore, using the calculated geometric scale, content in an image (such as the object) can be appropriately scaled and included in a virtual reality and/or an augmented reality. As a consequence, the image-processing technique may improve the performance of a variety of applications, with a commensurate impact on the user experience, as well as customer loyalty and the profitability and market share of the provider of the image-processing technique and/or the electronic device.

In the discussion that follows, the user may include one of a variety of entities, such as: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
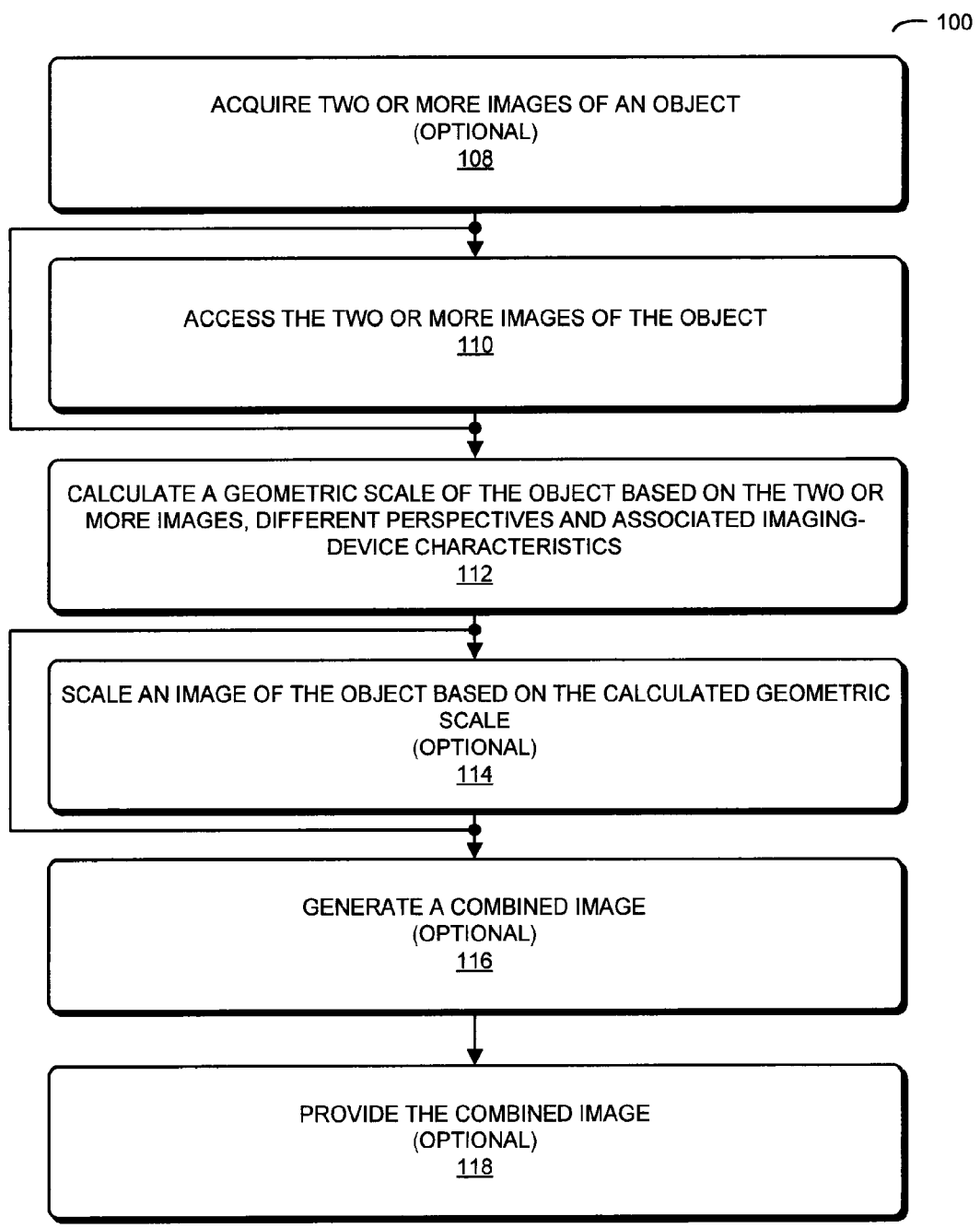
FIG. 1 is a flow chart illustrating a method for calculating a geometric scale of an object in accordance with an embodiment of the present disclosure.

We now describe embodiments of a technique for calculating a geometric scale of an object. FIG. 1 presents a flow chart illustrating a method 100 for calculating a geometric scale of an object, which may be performed by an electronic device, such as electronic device 700 in FIG. 7. During operation, the electronic device accesses two or more images of the object (operation 110). These two or more images may be associated with different perspectives of the object in an environment, and a given image may have an associated imaging-device characteristic. Note that a given perspective of the object may include: a location in the environment relative to the object and/or an orientation in the environment relative to the object. Moreover, the imaging-device characteristic may include: a distance between an imaging device that acquired the given image and the object and/or a focal length of the imaging device that acquired the given image.

In some embodiments, accessing the two or more images involves receiving the two or more images from another electronic device. Alternatively, prior to accessing the two or more images, the electronic device may optionally acquire the two or more images (operation 108); for example, the electronic device may be a portable electronic device, such as a cellular-telephone camera or a digital camera.

Moreover, the electronic device may calculate the geometric scale of the object based on the two or more images, the different perspectives and the imaging-device characteristics associated with the two or more images (operation 112).

Furthermore, the electronic device may optionally scale an image of the object based on the calculated geometric scale (operation 114). Then, the electronic device may optionally generate a combined image by combining the scaled image of the object with another image (operation 116), and may optionally provide the combined image (operation 118). For example, geometric scales of the object in two or three-dimensions may be calculated, and two or more of these geometric scales may be used to scale the image of the object. Note that the scaling may be based on another geometric scale associated with the other image, such as a size of a region in the other image.

Thus, using the calculated geometric scale, an image of an object may be appropriately (e.g., proportionately) scaled and combined with another image. For example, an image of a couch may be scaled so that it fits (in proportion to its size) in an image of a room in a house. Alternatively, the image of the object may be appropriately scaled so that it can be included in a virtual world (such as virtual or augmented reality) or a computer-aided-design environment. Moreover, this scaling may be performed without requiring additional user action, i.e., without requiring that a user manually scale the image of the object.

In some embodiments, the geometric scale is calculated based on a predefined geometric scale associated with the object, such as information provided by a manufacturer. For example, at least one geometric length of at least a portion of the object (such as a diameter of a tire) may be known. This predefined information may be accessed (for example, in a data structure) and may be used when the geometric scale of the object (such as the length of a car) is calculated.

Note that in some embodiments calculating the geometric scale also involves image recognition. In particular, image recognition may be used to determine the relative length and/or height (and, more generally, one or more relative geometric scales) of the object in one of the images. These relative values may be compared to relative values of the length and/or height (and, more generally, one or more relative geometric scales) of the object in another of the images. Then, using the imaging-device characteristics (such as the focal length), the absolute geometric scale or size of the object can be calculated.

Figure 2A:
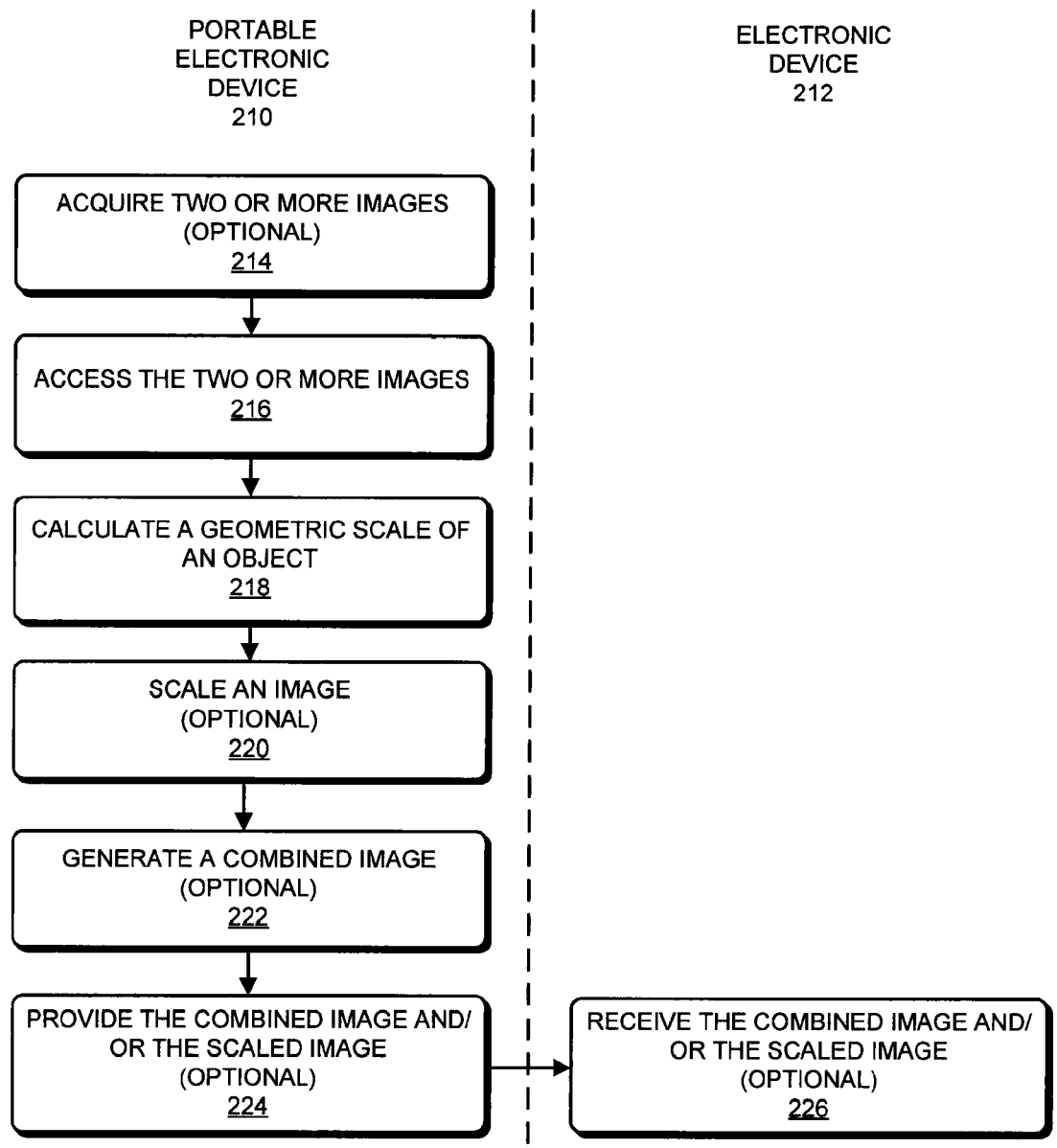
FIG. 2A is a flow chart illustrating the method of FIG. 1 in accordance with an embodiment of the present disclosure.

In an exemplary embodiment, the image-processing technique is implemented on a portable electronic device, such as a cellular telephone or a digital camera. This is illustrated in FIG. 2A, which presents a flow chart illustrating method 100 (FIG. 1). During this method, a user of a portable electronic device 210 may optionally acquire two or more images of an object (operation 214) from different perspectives in an environment that includes the object. Then, portable electronic device 210 may access the two or more images (operation 216) and may calculate a geometric scale of the object (operation 218) using the two or more images and associated imaging-device characteristics.

Moreover, portable electronic device 210 may optionally: scale an image of the object based on the calculated geometric scale (operation 220); combine the scaled image with another image to generate a combined image (operation 222); and provide the scaled image and/or the combined image (operation 224). The scaled image and/or the combined image may be optionally received by electronic device 212 (operation 226), such as a server or a computer system that generates a virtual world that includes the scaled image and/or the combined image.

By performing most of the processing (i.e., calculating the geometric scale) on portable electronic device 210, this embodiment may allow image(s) to be analyzed, combined and/or presented to a user in real time by portable electronic device 210.

Figure 2B:
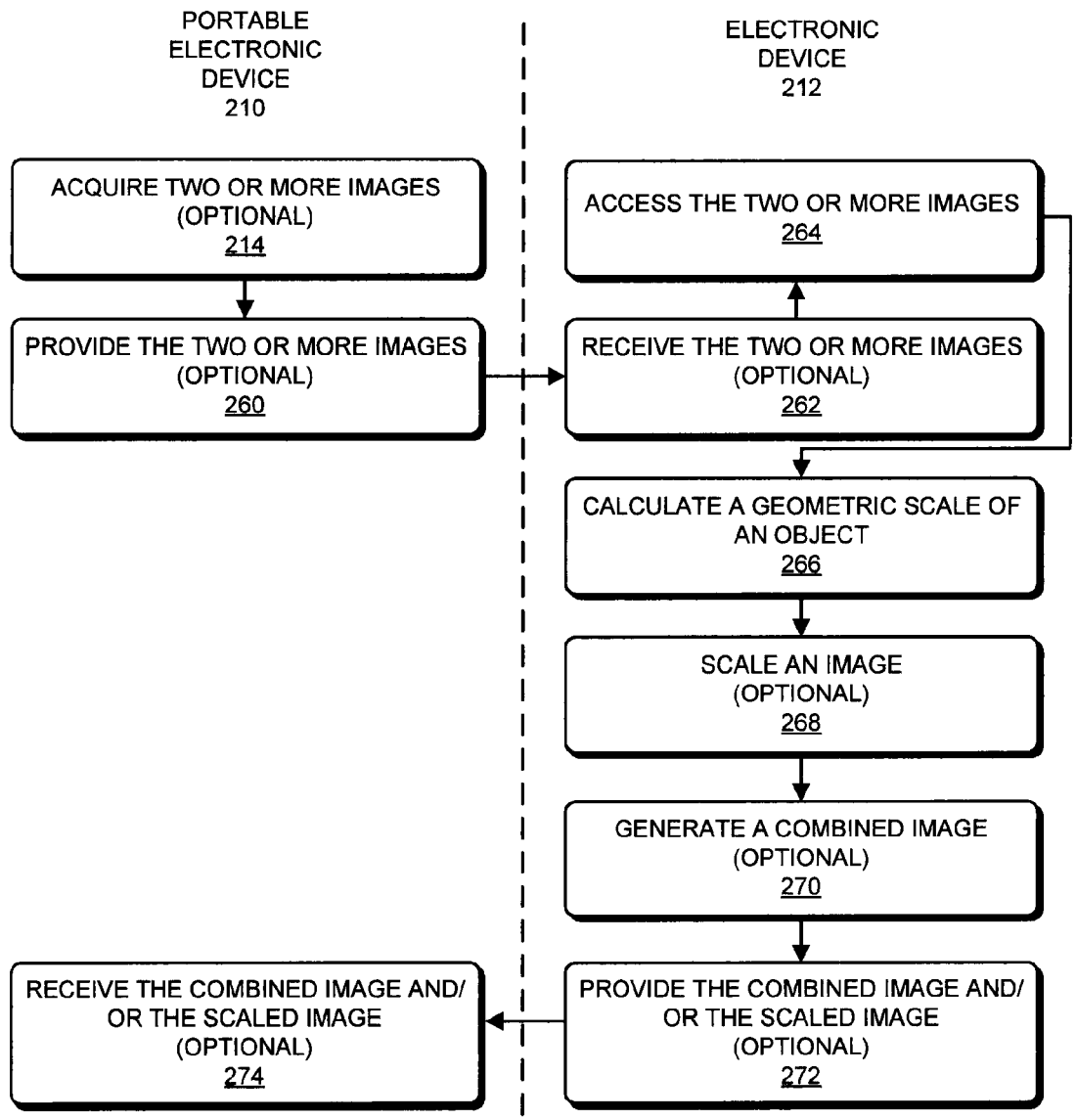
FIG. 2B is a flow chart illustrating the method of FIG. 1 in accordance with an embodiment of the present disclosure.

However, in other embodiments the image-processing technique is, at least in part, implemented on a server that communicates with one or more clients (such as one or more portable electronic devices) via a network (such as a cellular-telephone network or the Internet) using a client-server architecture. This is illustrated in FIG. 2B, which presents a flow chart illustrating method 100 (FIG. 1).

During this method, a user of a portable electronic device 210 may optionally acquire two or more images of an object (operation 214) from different perspectives in an environment that includes the object. Then, portable electronic device 210 may optionally provide the two or more images (operation 260), which are subsequently optionally received by electronic device 212 (operation 262).

Subsequently, electronic device 212 may access the two or more images (operation 264) and may calculate a geometric scale of the object (operation 266) using the two or more images and associated imaging-device characteristics.

Moreover, electronic device 212 may optionally: scale an image of the object based on the calculated geometric scale (operation 268); combine the scaled image with another image to generate a combined image (operation 270); and provide the scaled image and/or the combined image (operation 272). Then, the scaled image and/or combined image may be optionally received by portable electronic device 210 (operation 274). In some embodiments, electronic device 212 provides the scaled image and/or the combined image in a virtual world, i.e., electronic device 212 generates a virtual world that includes the scaled image and/or the combined image prior to operation 272.

Figure 3:
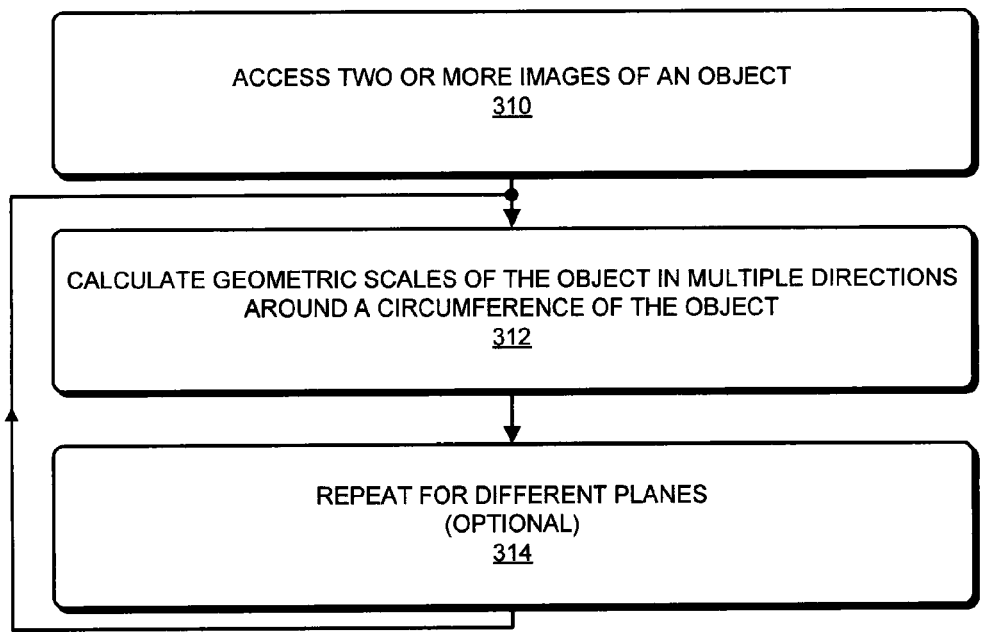
FIG. 3 is a flow chart illustrating a method for calculating a geometric scale of an object in accordance with an embodiment of the present disclosure.

While the preceding embodiments illustrated the use of the image-processing technique to calculate a geometric scale of the object along a direction, in some embodiments the image-processing technique is used to calculate geometric scales of an object along multiple directions in two or three dimensions. This is shown in FIG. 3, which presents a flow chart illustrating method 300 for calculating a geometric scale of an object, which may be performed by an electronic device, such as electronic device 700 in FIG. 7. In particular, during operation the electronic device may access the two or more images of the object (operation 310). These two or more images may include a sequence of images of the object along a circumference around the object in a plane.

Moreover, the electronic device may calculate geometric scales of the object for multiple directions in the plane around the circumference of the object based on the two or more images, the different perspectives and the imaging-device characteristics associated with the two or more images (operation 312). For example, the electronic device may determine a two-dimensional surface of the object in the plane based on the calculated geometric scales in the plane. Note that the geometric scales may be calculated based on a difference between locations associated with the two or more images and predefined reference markers in the environment (such as fiducial markers).

Additionally, the electronic device may optionally calculate the geometric scales for different planes by repeating operation 312 (operation 314), thereby determining a three-dimensional surface of the object. For example, the electronic device may determine the surface of an individual, and this information may be used to provide a service (such as tailoring clothing for the individual) or to perform a medical procedure (such as creating a customized cast or guiding a surgical procedure). In these embodiments, the geometric scales may be calculated based on a difference between locations associated with the two or more images and the predefined reference markers in the environment.

In some embodiments of methods 100 (FIGS. 1 and 2) and/or 300, there may be additional or fewer operations. Moreover, the order of the operations may be changed, and/or two or more operations may be combined into a single operation.

Figure 4:
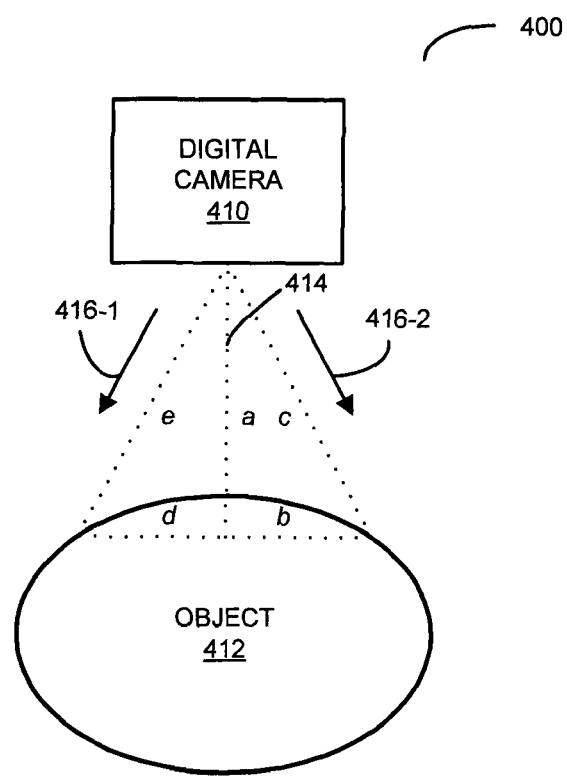
FIG. 4 is a drawing illustrating the calculation of the geometric scale of the object in the methods of FIGS. 1-3 in accordance with an embodiment of the present disclosure.

In an exemplary embodiment, the geometric scale(s) of the object may be calculated using the law of cosines. FIG. 4 presents a drawing 400 illustrating the calculation of the geometric scale of the object in methods 100 (FIGS. 1 and 2) and/or 300 (FIG. 3) for a 'perpendicular' geometry in which a digital camera 410 that acquires images of object 412 is along a perpendicular bisector 414 of a triangle. In this example, the law of cosines reduces to the Pythagorean theorem. As a consequence, $$a^2+b^2=c^2,$$

where a, b and c are sides of a right triangle. Rearranging yields $$b^2=c^2-a^2$$

or $$b=\sqrt{c^2-a^2}.$$

Similarly, $$a^2+d^2=e^2,$$

where a, d and e are sides of a right triangle. Rearranging yields $$d^2=e^2-a^2$$

or $$d=\sqrt{e^2-a^2}.$$

The desired geometric scale, i.e., the length of the object along a direction, is b+d. This can be determined from these equations using the focal lengths c and e when two images along directions 416-1 and 416-2 were acquired.

Figure 5:
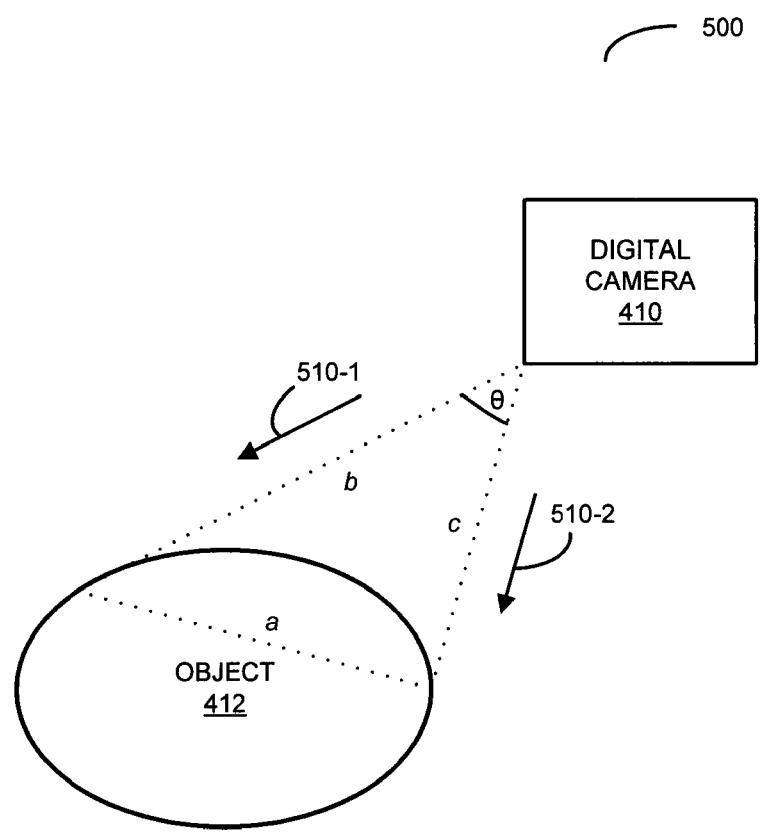
FIG. 5 is a drawing illustrating the calculation of the geometric scale of the object in the methods of FIGS. 1-3 in accordance with an embodiment of the present disclosure.

In a more general example, digital camera 410 that acquires images of object 412 is not along a perpendicular bisector 414 of a triangle. This is shown in FIG. 5, which presents a drawing 500 illustrating the calculation of the geometric scale of the object in methods 100 (FIGS. 1 and 2) and/or 300 (FIG. 3). In this case, the law of cosines may be used to calculate the geometric scale. In particular, $$a^2=b^2+c^2-2bc\cos(\theta)$$

or $$a^2=\sqrt{b^2+c^2-2bc\cos(\theta)},$$

where a is the desired geometric scale, i.e., the length of the object along a direction. This can be determined from this equation using the focal lengths b and c when the two images along directions 510-1 and 510-2 were acquired if the angle θ between these two 'perspectives' is known. For example, this angle may be determined when a given image is acquired using a local positioning system, a global positioning system and/or a compass. Moreover, the angle θ may be relative to a set of coordinates in a positioning system or may be relative to a direction, such as the North Pole.

In some embodiments, the focal length is provided by an autofocus system in a digital camera. Alternatively, the imaging-device characteristic may be the distance between the digital camera and the object, which may be determined using a laser interferometer and/or a time-of-flight measurement.

In an exemplary embodiment, a user is shopping for a couch. The user may take two or more images (from different perspectives) of a room in the user's home where the couch will be placed. Then, using the image-processing technique, one or more dimensions of the room (length, width and/or height) may be calculated.

Subsequently, when the user is shopping at a store, they may see a couch that they like. The user may take two or more images of this couch, from different perspectives. Then, the image-processing technique may calculate one or more dimensions of the couch. Using these dimensions, an image of the couch may be appropriately scaled and combined with an image of the room, so that the user can determine if the couch will fit in the room and/or if the couch looks nice in the room.

Figure 6:
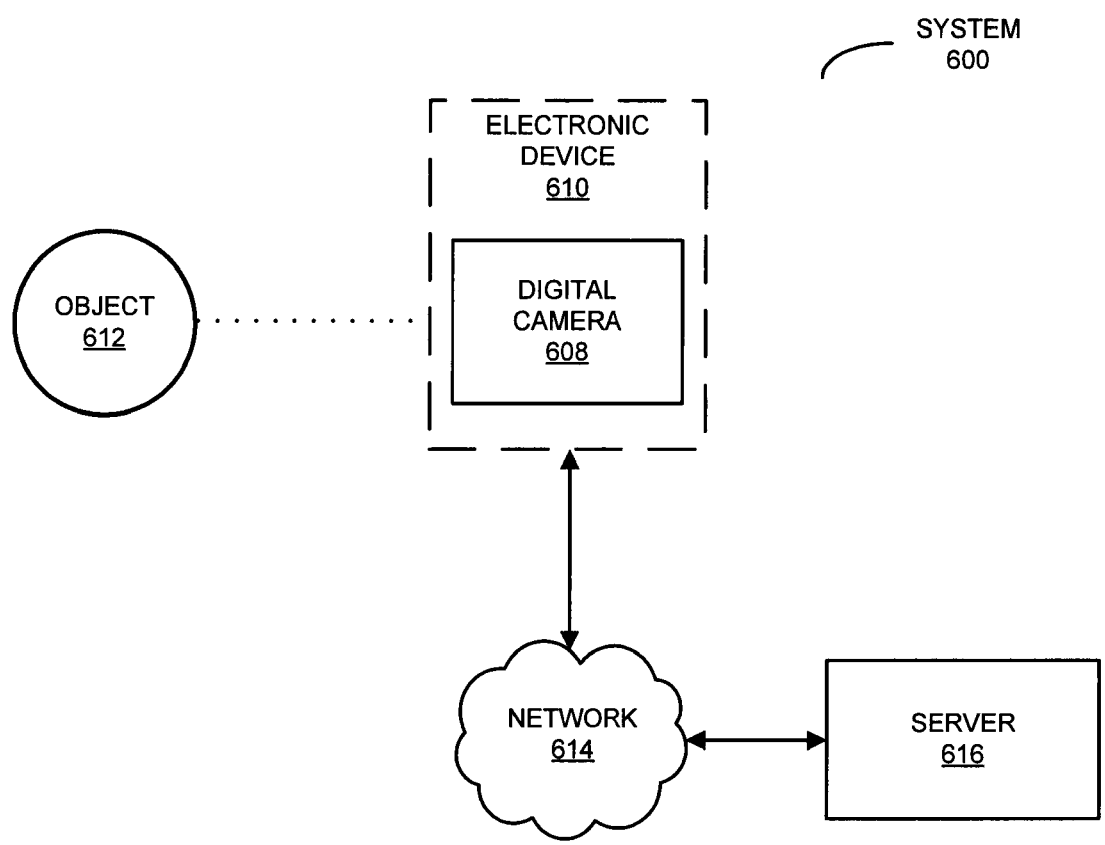
FIG. 6 is a block diagram illustrating a system that performs the methods of FIGS. 1-3 in accordance with an embodiment of the present disclosure.

We now describe embodiments of a system and the electronic device (which may be included in the system). FIG. 6 presents a block diagram illustrating a system 600 that performs methods 100 (FIGS. 1 and 2) and/or 300 (FIG. 3). In this system, portable electronic device 610 may acquire one or more images of an object 612 from different perspectives (i.e., from different locations and/or orientations relative to object 612), for example, using digital camera 608. These image(s) and associated imaging-device characteristics may be used to calculate one or more geometric scales of object 612. This calculation may be performed on portable electronic device 610.

Alternatively or additionally, after portable electronic device 610 provides the images via network 614, the calculation may be performed on another electronic device, such as server 616.

Moreover, using the one or more calculated geometric scales, portable electronic device 610 and/or server 616 may scale one of the images and/or combine the scaled image with another image. Furthermore, the scaled image and/or the combined image may be displayed on portable electronic device 610. In embodiments where the image-processing is performed on server 616, the scaled image and/or the combined image may be provided by server 616 to portable electronic device 610 via network 614 for subsequent display.

Note that this image-processing technique may be performed using hardware and/or software. Moreover, software that executes in the environment of portable electronic device 610 may include: a stand-alone application or a portion of another application that is resident on and which executes on portable electronic device 610 (such as software that is provided by server 616 or that is installed and which executes on portable electronic device 610). Alternatively, the user may interact with a web page that is provided by server 616 via network 614, and which is rendered by a web browser on portable electronic device 610.

In some embodiments, at least a portion of the software may be an application tool (such as a software application tool) that is embedded in the web page (and which executes in a virtual environment of the web browser). Thus, the software application tool may be provided to the user via a client-server architecture.

Furthermore, note that the image(s) and related information (such as the imaging-device characteristics) may be stored at one or more locations in system 600 (i.e., locally or remotely). Because this data may be sensitive in nature, it may be encrypted. For example, stored data and/or data communicated via network 614 may be encrypted.

Figure 7:
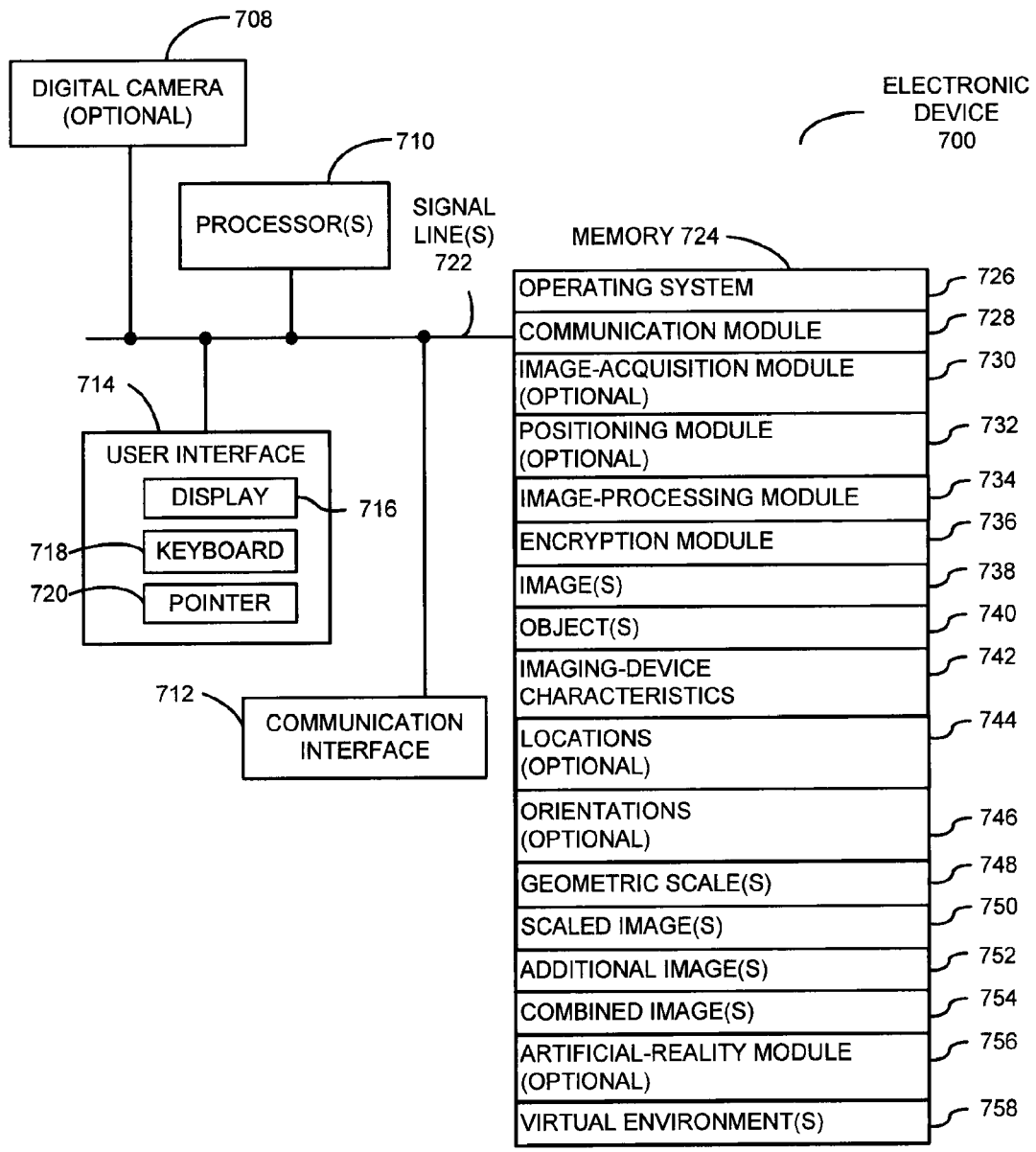
FIG. 7 is a block diagram illustrating an electronic device that performs the methods of FIGS. 1-3 in accordance with an embodiment of the present disclosure.

FIG. 7 presents a block diagram illustrating an electronic device 700 that performs methods 100 (FIGS. 1 and 2) and/or 300 (FIG. 3), such as portable electronic device 610 (FIG. 6) or server 616 (FIG. 6). Electronic device 700 includes one or more processing units or processors 710, a communication interface 712, a user interface 714, and one or more signal lines 722 coupling these components together. Note that the one or more processors 710 may support parallel processing and/or multi-threaded operation, the communication interface 712 may have a persistent communication connection, and the one or more signal lines 722 may constitute a communication bus. Moreover, the user interface 714 may include: a display 716, a keyboard 718, and/or a pointer 720, such as a mouse. Additionally, electronic device 700 may include optional digital camera 708.

Memory 724 in electronic device 700 may include volatile memory and/or non-volatile memory. More specifically, memory 724 may include: ROM, RAM, EPROM, EEPROM, flash memory, one or more smart cards, one or more magnetic disc storage devices, and/or one or more optical storage devices. Memory 724 may store an operating system 726 that includes procedures (or a set of instructions) for handling various basic system services for performing hardware-dependent tasks. Memory 724 may also store procedures (or a set of instructions) in a communication module 728. These communication procedures may be used for communicating with one or more computers and/or servers, including computers and/or servers that are remotely located with respect to electronic device 700.

Memory 724 may also include multiple program modules (or sets of instructions), including: optional image-acquisition module 730 (or a set of instructions), optional positioning module 732 (or a set of instructions), image-processing module 734 (or a set of instructions), encryption module 736 (or a set of instructions) and/or optional artificial-reality module 756 (or a set of instructions). Note that one or more of these program modules (or sets of instructions) may constitute a computer-program mechanism.

During methods 100 (FIGS. 1 and 2) and/or 300 (FIG. 3), in embodiments where electronic device 700 is a portable electronic device, a user may acquire one or more image(s) 738 of one or more object(s) 740 in an environment using optional digital camera 708 and optional image-acquisition module 730. These images 738 may be acquired from different perspectives and may be associated with imaging-device characteristics 742 (such as focal lengths).

Furthermore, when acquiring images 738, optional locations 744 and/or optional orientations 746 of optional digital camera 708 in the environment may be determined using optional positioning module 732. This positioning information may be based on one or more sensors and/or positioning techniques, such as: a global-positioning system, a compass, an accelerometer, a gyroscope and/or image analysis of the one or more image(s) 738. Moreover, the location may be determined to within 10 m of the actual location of electronic device 700, and the orientation may be determined to within 5-10°.

Then, one or more geometric scale(s) 748 of at least one of object(s) 740 may be calculated by image-processing module 734 using two or more of image(s) 738, the associated imaging-device characteristics 742 and/or optional locations 744 and/or optional orientations 746. Furthermore, image-processing module 734 may scale one or more image(s) 738 and combine scaled image(s) 750 with one or more additional image(s) 752 to generate one or more combined image(s)

754. The scaled image(s) 750 and/or the one or more combined image(s) 754 may be displayed on display 716.

In some embodiments, artificial-reality module 756 incorporates one or more of scaled image(s) 750 and/or combined image(s) 754 into one or more virtual environment(s) 758 (such as a virtual reality or an augmented reality), which may be displayed on display 716.

Figure 8:
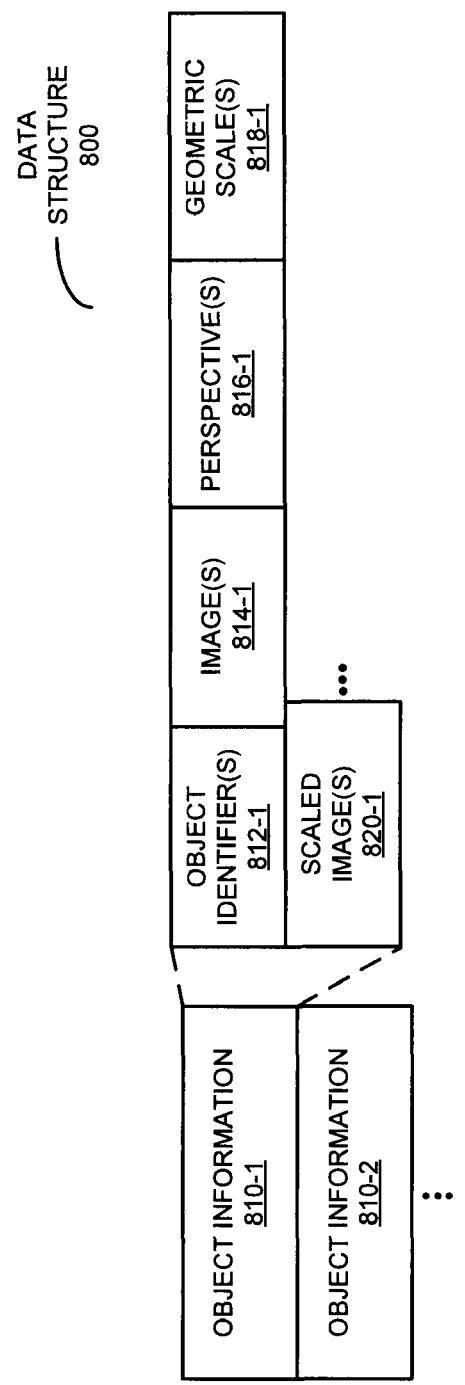
FIG. 8 is a block diagram illustrating a data structure for use in conjunction with the electronic device of FIG. 7 in accordance with an embodiment of the present disclosure.

The results of the image-processing technique may be stored in a data structure. This data structure is shown in FIG. 8, which presents a block diagram illustrating a data structure 800. In particular, data structure 800 may include object information 810 associated with different objects. For example, object information 810-1 may include: one or more object identifier(s) 812-1, one or more image(s) 814-1, perspective(s) 816-1 of the one or more image(s) 814-1, one or more geometric scale(s) 818-1 of the one or more object(s), and/or one or more scaled image(s) 820-1.

Alternatively, in embodiments where electronic device 700 is a computer system (such as server 616 in FIG. 6), the one or more image(s) 738 may be received from a portable electronic device using communication interface 712 and communication module 728, and may be accessed by image-processing module 734. Furthermore, imaging-device characteristics 742, optional locations 744 and/or optional orientations 746 from the portable electronic device may be received using communication module 728 and/or may be accessed by image-processing module 734.

After calculating the one or more geometric scale(s) 748, scaled image(s) 750, combined image(s) 754 and/or virtual environment(s) 758, this information may be provided to the portable electronic device using communication module 728 and communication interface 712 for subsequent display to a user.

Because the images and associated information may be sensitive in nature, in some embodiments at least some of the data stored in memory 724 and/or at least some of the data communicated using communication module 728 is encrypted using encryption module 736.

Instructions in the various modules in memory 724 may be implemented in: a high-level procedural language, an object-oriented programming language, and/or an assembly or machine language. Note that the programming language may be compiled or interpreted, e.g., configurable or configured, to be executed by the one or more processors 710.

Although electronic device 700 is illustrated as having a number of discrete items, FIG. 7 is intended to be a functional description of the various features that may be present in electronic device 700 rather than a structural schematic of the embodiments described herein. In practice, and as recognized by those of ordinary skill in the art, the functions of electronic device 700 may be distributed over a large number of electronic devices, servers or computers, with various groups of the servers or computers performing particular subsets of the functions. In some embodiments, some or all of the functionality of electronic device 700 may be implemented in one or more application-specific integrated circuits (ASICs) and/or one or more digital signal processors (DSPs).

Electronic devices, computers and servers in system 600 (FIG. 6) and/or electronic device 700 may include one of a variety of devices capable of manipulating computer-readable data or communicating such data between two or more computing systems over a network, including: a personal computer, a laptop computer, a mainframe computer, a portable electronic device (such as a cellular phone, a digital camera or a PDA), a server and/or a client computer (in a client-server architecture). Moreover, network 614 (FIG. 6) may include: the Internet, World Wide Web (WWW), an intranet, LAN, WAN, MAN, or a combination of networks, or other technology enabling communication between computing systems.

System 600 (FIG. 6), electronic device 700 and/or data structure 800 (FIG. 8) may include fewer components or additional components. Moreover, two or more components may be combined into a single component, and/or a position of one or more components may be changed. In some embodiments, the functionality of system 600 (FIG. 6) and/or electronic device 700 may be implemented more in hardware and less in software, or less in hardware and more in software, as is known in the art.

This image-processing technique may be used in a wide variety of applications, such as: modifying real-time movies, architecture, defense, medicine, engineering, fashion, etc. For example, the image-processing technique may be used in retail applications to assist in the arrangement and/or display of merchandise.

In some embodiments, the images of the object may be associated with financial information and/or financial software, such as: Quicken™ and/or TurboTax™ (from Intuit, Inc., of Mountain View, Calif.), Microsoft Money™ (from Microsoft Corporation, of Redmond, Wash.), Splash-Money™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information. Alternatively or additionally, the financial software may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

For example, the image-processing technique could be used to improve the accuracy of an optical-character-recognition scan of a financial document, such as a tax document (which can be challenging because users often take pictures of tax documents from too close or too far away for existing optical-character-recognition techniques). Using the image-processing technique, the scale of a financial document may be determined in real time, and this may allow real-time feedback as to how far away users should be when they take pictures. Alternatively or additionally, the scale of the financial document may be used to improve the processing of associated images and, this, to improve the accuracy of optical character recognition.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic-device-implemented method for calculating a geometric scale of an object, comprising:
    accessing two or more images of the object, wherein the two or more images are associated with different perspectives of the object in an environment, and wherein a given image has an associated imaging-device characteristic;
    calculating the geometric scale of the object based on the two or more images, the different perspectives, and the imaging-device characteristics associated with the two or more images;
    scaling an image of the object based on the calculated geometric scale; and
    providing a combined image, wherein the combined image is generated by combining the scaled image of the object with another image.

2. The method of claim 1, wherein accessing the two or more images involves receiving the two or more images from another electronic device.

3. The method of claim 1, wherein, prior to accessing the two or more images, the method further includes acquiring the two or more images using the electronic device.

4. The method of claim 1, wherein a given perspective of the object includes a location in the environment relative to the object.

5. The method of claim 1, wherein a given perspective of the object includes an orientation in the environment relative to the object.

6. The method of claim 1, wherein the imaging-device characteristic includes a distance between an imaging device that acquired the given image and the object.

7. The method of claim 1, wherein the imaging-device characteristic includes a focal length of an imaging device that acquired the given image.

8. The method of claim 1, wherein the geometric scale is calculated using the law of cosines.

9. The method of claim 1, wherein the two or more images include a sequence of images of the object along a circumference around the object in a plane; and
    wherein the method further includes:
    calculating geometric scales of the object for multiple directions in the plane around the circumference of the object; and
    determining a two-dimensional surface of the object in the plane based on the calculated geometric scales in the plane.

10. The method of claim 9, wherein the geometric scales are calculated based on a difference between locations associated with the two or more images and predefined reference markers in the environment.

11. The method of claim 9, wherein the method further includes calculating the geometric scales for different planes, thereby determining a three-dimensional surface of the object.

12. The method of claim 11, wherein the geometric scales are calculated based on a difference between locations associated with the two or more images and predefined reference markers in the environment.

13. The method of claim 1, wherein the scaling is based on another geometric scale associated with the other image.

14. The method of claim 1, wherein the geometric scale is calculated based on a predefined geometric scale associated with the object.

15. A non-transitory computer-program product for use in conjunction with a computer system, the computer-program product comprising a computer-readable storage medium and a computer-program mechanism embedded therein, to calculate a geometric scale of an object, the computer-program mechanism including:
    instructions for accessing two or more images of the object, wherein the two or more images are associated with different perspectives of the object in an environment, and wherein a given image has an associated imaging-device characteristic;
    instructions for calculating the geometric scale of the object based on the two or more images, the different perspectives, and the imaging-device characteristics associated with the two or more images;
    instructions for scaling an image of the object based on the calculated geometric scale;
    instructions for generating a combined image by combining the scaled image of the object with another image; and
    instructions for providing the combined image.

16. The computer-program product of claim 15, wherein a given perspective of the object includes a location in the environment relative to the object.

17. The computer-program product of claim 15, wherein a given perspective of the object includes an orientation in the environment relative to the object.

18. The computer-program product of claim 15, wherein the imaging-device characteristic includes a distance between an imaging device that acquired the given image and the object.

19. The computer-program product of claim 15, wherein the two or more images include a sequence of images of the object along a circumference around the object in a plane; and
    wherein the computer-program mechanism further includes:
    instructions for calculating geometric scales of the object for multiple directions in the plane around the circumference of the object; and
    instructions for determining a two-dimensional surface of the object in the plane based on the calculated geometric scales in the plane.

20. A computer system, comprising:
    a processor;
    memory; and
    a program module, wherein the program module is stored in the memory and configurable to be executed by the processor to calculate a geometric scale of an object, the program module including:
    instructions for accessing two or more images of the object, wherein the two or more images are associated with different perspectives of the object in an environment, and wherein a given image has an associated imaging-device characteristic;
    instructions for calculating the geometric scale of the object based on the two or more images, the different perspectives, and the imaging-device characteristics associated with the two or more images;

instructions for scaling an image of the object based on the calculated geometric scale;
instructions for generating a combined image by combining the scaled image of the object with another image; and
instructions for providing the combined image.

* * * * *